United States Patent
Lewis et al.

(10) Patent No.: US 9,055,343 B1
(45) Date of Patent: Jun. 9, 2015

(54) RECOMMENDING CONTENT BASED ON PROBABILITY THAT A USER HAS INTEREST IN VIEWING THE CONTENT AGAIN

(71) Applicant: Google Inc., Mountain View, CA (US)

(72) Inventors: Justin Lewis, Marina Del Rey, CA (US); Ruxandra Georgiana Paun, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/913,033

(22) Filed: Jun. 7, 2013

(51) Int. Cl.
*H04N 21/482* (2011.01)
*H04N 21/442* (2011.01)
*H04N 21/25* (2011.01)
*H04N 21/466* (2011.01)
*H04N 21/45* (2011.01)

(52) U.S. Cl.
CPC ..... *H04N 21/4826* (2013.01); *H04N 21/44204* (2013.01); *H04N 21/251* (2013.01); *H04N 21/466* (2013.01); *H04N 21/4532* (2013.01); *H04N 21/4668* (2013.01); *H04N 21/4662* (2013.01); *H04N 21/25* (2013.01); *H04N 21/252* (2013.01)

(58) Field of Classification Search
CPC ... H04N 21/25; H04N 21/251; H04N 21/252; H04N 21/258; H04N 21/25891; H04N 21/45; H04N 21/4532; H04N 21/466
See application file for complete search history.

(56) References Cited

U.S. PATENT DOCUMENTS

| | | | |
|---|---|---|---|
| 8,260,657 B1 * | 9/2012 | Conway | 705/7.35 |
| 8,495,698 B2 * | 7/2013 | Walker et al. | 725/145 |
| 8,775,287 B1 * | 7/2014 | Igoe et al. | 705/35 |
| 2002/0056095 A1 * | 5/2002 | Uehara et al. | 725/38 |
| 2002/0062250 A1 * | 5/2002 | Nagano et al. | 705/14 |
| 2008/0134043 A1 * | 6/2008 | Georgis et al. | 715/733 |
| 2011/0289139 A1 * | 11/2011 | McIntosh et al. | 709/203 |

* cited by examiner

*Primary Examiner* — Justin Shepard
(74) *Attorney, Agent, or Firm* — Amin, Turocy & Watson, LLP

(57) ABSTRACT

Systems and methods for recommending content to a user that the user previously viewed for viewing again are presented. A system includes a crawling component configured to crawl watch histories of a plurality of users, wherein the watch histories reflect videos watched by respective users of the plurality of users, and identify based on the watch histories, a set of videos that have been watched more than once by individual users of the plurality of users. An identification component further analyzes watch history of a first user, wherein the watch history of the first user reflects videos watched by the first user, and identifies based on the watch history of the first user, one or more videos watched by the first user that are included in the set of videos, and a recommendation component recommends the one or more videos to the first user for re-watching.

20 Claims, 11 Drawing Sheets

RECOMMENDING CONTENT BASED ON PROBABILITY THAT A USER HAS INTEREST IN VIEWING THE CONTENT AGAIN

TECHNICAL FIELD

This application generally relates to systems and methods for recommending content based on probability that a user has interest in viewing such content again.

BACKGROUND

The proliferation of available streaming content is increasing at exponential levels that will soon reach many millions if not billions of such viewable streaming content. Conventionally, broadcast media has been provided by television or cable channels that typically have been provided by a relatively small number of content providers. However, with the ubiquitous nature of media creation and publishing tools, individuals are able to become productive content creators. This has resulted in the exponential growth of available streaming content as well as available channels for streaming the content. Although users enjoy the plethora of viewing options associated with available streaming content, the task of searching through this sea of content to find items of interest is becoming increasingly difficult. Often times, content that a user may desire to view is something that the user has previously viewed. However, content distribution systems fail to provide an effective tool for finding previously viewed content that a user would desire to re-watch.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
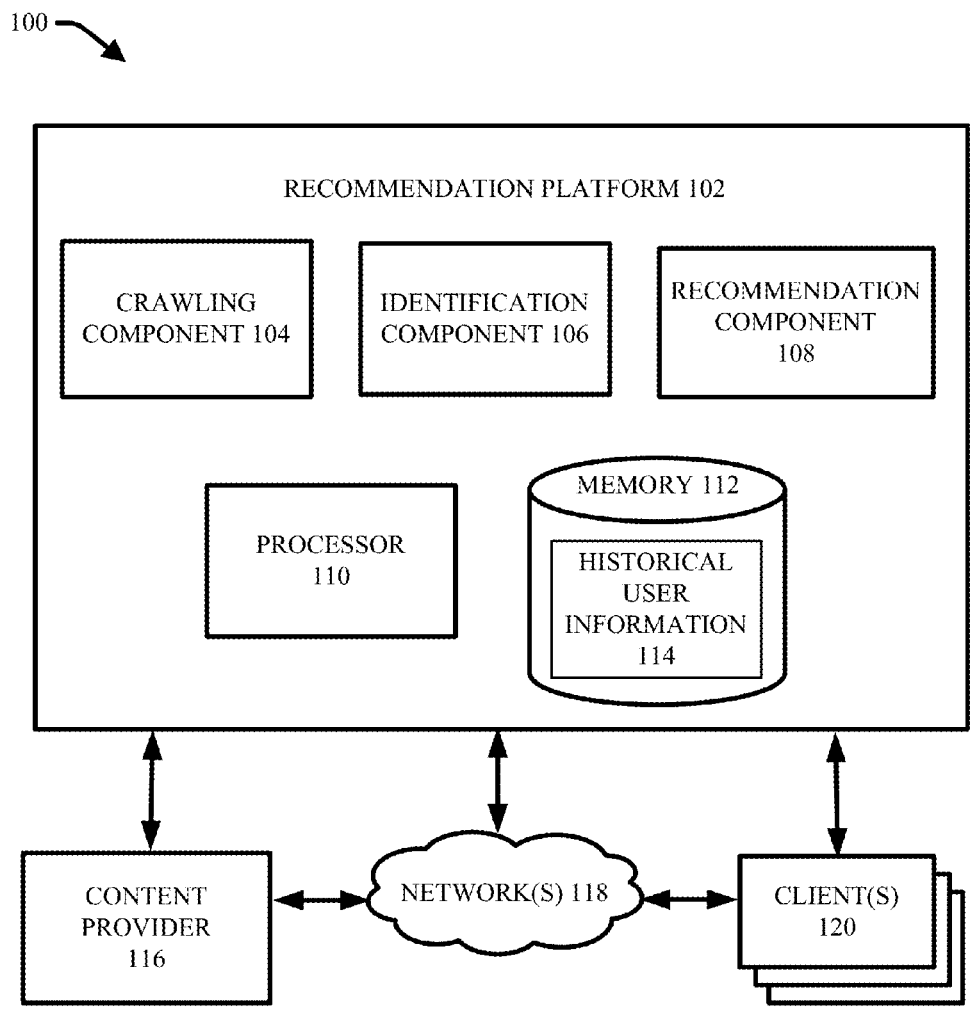
FIG. 1 illustrates an example system for recommending content based on probability that a user has interest in viewing such content again in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods for recommending content based on probability that a user has interest in viewing such content again. For example, when accessing streaming media content on a regular basis from a streaming media provider, the user may often desire to re-watch certain videos. In one aspect, systems and methods are provided for predicting what videos the user may desire to re-watch by analyzing watch histories for a large number of users to identify a set of videos that are frequently re-watched. The watch history of the user is also analyzed to identify a subset of videos the user has watched or liked that are included in the set of frequently re-watched videos. This subset of videos can then be recommended to the user for re-watching.

In one or more aspects, a system is provided that includes a crawling component configured to crawl watch histories of a plurality of users. The watch histories reflect videos watched by respective users of the plurality of users, and identify based on the watch histories, a set of videos that have been watched more than once by respective users of the plurality of users. The system further includes an identification component configured to analyze a watch history of a first user. The watch history of the first user reflects videos watched or liked by the first user. The identification component is further configured to identify based on the watch history of the first user, one or more videos watched by the first user that are included in the set of videos. A recommendation component of the system is further configured to recommend the one or more videos to the first user for re-watching.

In another aspect, a method is disclosed that includes crawling watch histories of a plurality of users. The watch histories reflect videos watched by respective users of the plurality of users. The method further includes identifying, based on the watch histories, a set of videos that have been re-watched by individual users of the plurality of users. The method further includes analyzing a watch history of a first user, wherein the watch history of the first user reflects videos watched by the first user and identifying, based on the analyzing, one or more videos watched by the first user that are included in the set of videos. The method further includes recommending the one or more videos to the first user for re-watching. In one or more additional aspects, the method can include inferring probabilities that the first user has an interest in re-watching the one or more videos respectively, ranking the one or more videos as a function of the probabilities, recommending the one or more videos based in part on the ranking.

Further provided is a tangible computer-readable storage medium comprising computer-readable instructions that, in response to execution, cause a computing system to perform various operations. These operations include crawling watch histories of a plurality of users, wherein the watch histories reflect videos watched by respective users of the plurality of users and identifying, based on the watch histories, a set of videos that have been re-watched by individual users of the plurality of users. These operations further include identifying, one or more videos liked by a first user that are included in the set of videos, and recommending the one or more videos to the first user for re-watching.

Referring now to the drawings, with reference initially to FIG. 1, presented is diagram of an example system 100 recommending content to a user that the user previously viewed for viewing again based on a probability the user has an interest in viewing the content again, in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes a recommendation platform 102, a content provider 116, one or more networks 118 and one or more client devices 120. Recommendation platform 102 can include memory 112 for storing computer executable components and instructions. Recommendation platform 102 can further include a processor 110 to facilitate operation of the instructions (e.g., computer executable components and instructions) by the recommendation platform 102

Recommendation platform 102 is configured to identify content that a user of client device 120 has previously interacted with in some manner giving rise to an indication that the user had an interest in the content. The recommendation platform 102 can further recommend the identified content to the user based on a determined or inferred probability that the user would have interest in viewing/accessing the content again. For example, recommendation platform 102 can identify videos watched or liked by a user, photos viewed by a user, or articles read by a user. The recommendation platform 102 can employ various techniques described herein to determine or infer a probability that the user would have interest in watching any of the videos again, viewing any of the photos again, or reading any of the articles again. In an aspect, the recommendation platform can then recommend videos, photos and articles previously watched, viewed, or read respectively, as a function of the probability the user would have interest in watching, viewing or reading such item(s) again.

As used herein, the term content refers to information that is formatted to be provided to a user in a digital medium at a computing device (e.g., client device 120) and provides substantive value to the user. Content associated with the disclosed systems includes content that can be consumed or accessed (e.g. shared) by a plurality of users. The term content can include various forms or types including text content and multimedia content. For example, text content can include written articles, books, magazines, posts, tweets or commentary. Multimedia content can include still images (e.g., pictures, photos, drawings), audio (e.g., music, sound, noise), and video (e.g., videos clips, advertisements, streaming video, full length movies, etc.). The term content as used throughout the subject disclosure can refer to a body of content and single content items. The term content item is distinguished in the subject disclosure as a single piece of content that can be re-accessed by a single user. For example, a content item can include an article, a posting, a song, a video and etc. The term media item is used throughout the subject disclosure to refer to a content item that is media or multimedia, such as a picture, a song or a video.

In an aspect, content is provided to a user at a client device 120 via a content provider 116 over a network 118. Client device 120 can include any suitable computing device associated with a user, and is configured to interact with a content provider 116 and/or recommendation platform 102. For example, client device 120 can include a desktop computer, a laptop computer, a television, a mobile phone, a tablet personal computer (PC), or a personal digital assistant PDA. As used in this disclosure, the terms "content consumer" or "user" refers to a person, entity, system, or combination thereof that employs system 100 (or additional systems described in this disclosure) using client device 120 . Network(s) 118 can include wired and wireless networks, including but are not limited to, a cellular network, a wide area network (WAD, e.g., the Internet), a local area network (LAN), or a personal area network (PAN). For example, client device 120 can communicate with content provider 116 and/or recommendation platform (and vice versa) using virtually any suitable and desired wired or wireless technology, including, for example, cellular, WAN, wireless fidelity (Wi-Fi), Wi-Max, WLAN, etc. In an aspect, one or more components of system 100 are configured to interact via disparate networks. For example, client device 120 can access and receive content from content provider 116 over a LAN while recommendation platform 102 can communicate with content provider 116 over a WAN.

In other aspects, content provider 116 can include recommendation platform 102 (e.g., content provider 116 can communicate directly with recommendation platform) and client device 120 can be configured to access content provider 116 including the recommendation platform via network 118. Still in yet another aspect, a client can include recommendation platform 102 and locally stored content (e.g., content stored at client device 120). According to this aspect, recommendation platform 102 can identify and recommend locally stored content that a user has accessed/viewed and may have interest in viewing/accessing again.

Content provider 116 can include an entity that provides digital content to a user via a network 118 (e.g., the Internet). In an aspect, content provider 116 can employ one or more server computing devices to store and deliver content to users that can be accessed using a browser. For example, content provider 116 can provide content to a user via a website. An example, content provider 116 can include an entity that provides streaming video to users over network 118. The video can be stored at one or more servers and accessed by a client device via a website. Other example content providers configured to provide digital content to a user over network can include but are not limited to: an entity that provides social networking services and information, an entity that compiles photos and/or links to information found interesting to users at various websites, an entity that provides news articles and news multimedia, an entity that complies photos, an entity that compiles written reviews of places and things, or an entity that provides products for purchasing.

It should be appreciated that the types of content providers described above are merely exemplary and that recommendation system 100 (and additional systems described herein) can employed with a vast array of content providers providing various types of content. Recommendation systems described herein are primarily exemplified where content provider 116 is a multimedia content provider configured to provide streaming video to a client device 120 over a network 118. Accordingly, the recommendation systems will be primarily described where videos watched or liked by a user are recommended for re-watching by the user. However, it should be appreciated that recommendation systems described herein can be used to identify and recommend re-viewing, re-accessing, re-listening, etc., various types of content provided by respective content providers.

A user can interact with content in various manners depending on type of content. For example, a user may be able to view a link to content, view a summary of content, access and view the content, access and play the content (e.g., where the content includes video or audio), view and provide comments regarding the content, view and mark the content with an indication that the user likes or dislikes the content, view and share the content with another user (e.g., via posting a link to the content, emailing a link to the content, etc.), view and download or store the content, save or generate a reference locator for the content, etc. In an aspect, the manner and degree of interaction with content can influence probability the user would have interest in accessing/viewing the content again. For example, a video that a user views, shares a link to, and provides commentary on can be considered more interesting to the user as compared to a video a user views a summary of and merely saves for viewing later. Accordingly, in one or more aspects, recommendation platform 102 can track manner and degree in which a user interacts with content.

In order to facilitate identifying and recommending content that has been accessed/viewed that the user may desire to re-access/re-view, recommendation platform 102 can include crawling component 104, identification component 106, and recommendation component 108. Crawling component 104 is configured to gather information regarding content offered by content provider 116 that individual users generally access (e.g., view, listen to, watch, read, etc.) more than once. As used herein, the terms re-access, re-view, re-listen to, re-watch, and re-read, respectively indicate that a single user has accessed, viewed, listen to, watched and read, respectively, certain content more than once. In particular, crawling component 104 is configured to crawl information logs relating to a set of users searching for information regarding content a subset of the users respectively interacted with and accessed (e.g., viewed, listened to, watched, read, etc.) and identify content individual users interacted with/accessed more than once. In an aspect, information logs having historical user information regarding content accessed/viewed by a user can be stored in memory 112 in historical user information 114 database. In another aspect, information logs for users can be stored in external memory (e.g., in memory of content provider 116 or another networked entity) that can be accessed by recommendation platform 102.

For example, where content provider 116 provides a plurality (e.g., from thousands to billions) of videos for watching by a corpus of users, the crawling component 104 can crawl watch histories associated with the users that reflect videos respective watched by the users. According to this example, a watch history for any given user can have information including but not limited to: videos watched by the user, number of times the respective videos were watched by the user, or times when the respective videos were watched by the user. The crawling component 104 can analyze the watch histories for each of the plurality of users to at least identify a set of videos that have been watched more than once by individual users. In other words, the crawling component 104 can identify videos offered by the content provider 116 to users that tend to be re-watched. As used herein, a video can be considered re-watched if the video is watched more than once by the same user.

In an aspect, crawling component 104 can be configured to identify sets of re-watched videos that are restricted by additional criteria besides having been re-watched at least once (e.g., watched at least twice by a single user). According to this aspect, crawling component 104 can be configured to apply one or more filters that further restrict sets of re-watched videos based on various criteria. For example, a filter employed by crawling component 104 can include but is not limited to: a filter that restricts a set of re-watched videos based on number of times the videos in the set have been re-watched; a filter that restricts a set of re-watched videos based on number of users who have re-watched the videos in the set, a filter that restricts a set of re-watched videos based on average frequency of re-watch in a predetermined time period, and/or type of users that re-watched the videos (e.g., where users can be clustered into types based on various factors including but not limited to: preferences, demographics, and social circles).

It should be appreciated that sets of re-watched videos (e.g., or re-accessed content where the content does not include videos) associated with a content provider 116 will continuously change over time as different and same users re-watch (or stop re-watching) existing videos offered by the content provider and as new videos are offered by the content provider. Accordingly, crawling component 104 can be configured to dynamically generate sets of re-watched videos. In an aspect, crawling component 104 can identify a set of re-watched videos on scheduled basis. For example, crawling component 104 can be configured to identify a set of re-watched videos every hour, every day, every week, etc. In another aspect, crawling component 104 can identify a set of re-watched videos in response to a request. For example, a request can be associated with initial access of content offered by content provider 116 by a user at a website through which the user interfaces with the content provider 116. In another example, a request can be associated with a search query request initiated by a user.

The identification component 106 is configured to examine an information log for a particular user having information regarding content the user has previously accessed/viewed, to identify content in the information log that overlaps with a set of content identified by the crawling component 104 that tends to be re-accessed/re-viewed by a group of users. Thus, for a particular user at a given point in time, the identification component 106 can generate a list of content that a user has accessed, viewed, watched, or otherwise expressed interest in that matches content included in a set of content identified by crawling component 104 as content that has been re-accessed/re-viewed/re-watched by other users. This list can then be used for various purposes. For example, the list can be used to recommend and/or push content to the user for re-watching, influence search results associated with searches conducted by the user, influence advertisement placement in and charging models associated with the content, or employed for market research.

For example, where content provider 116 provides a plurality of videos, crawling component 104 can identify a set of videos from the plurality of videos that have been re-watched by a group of users. The identification component 106 can identify one or more videos included in a particular user's watch history that are included in the set of videos identified by the crawling component 104. In another aspect, the identification component 106 can identify one or more videos included in the set of videos that a particular user expressed a liking for, shared with another user, commented on, and/or otherwise interacted with in a manner that indicates positive interest in the one or more videos. The recommendation component 108 can recommend the one or more videos included in the particular user's watch history and/or liked, shared, commented on, etc., that are included in the set of videos identified by the crawling component 104 to the particular user.

In an aspect, the identification component 106 can also identify content that a user expressed a disliking for that is included in a set of content identified by the crawling component 104 that users tend to re-access/re-view. For example, the identification component 106 can identify one or more videos that a user marked as disliked, or videos which the user provided a poor rating or bad review for that are included in a set of commonly re-watched videos identified by crawling component 104. The recommendation component 108 can further choose not to recommend those disliked videos for re-watching by the user.

The recommendation component 108 is configured to recommend content to a user (for re-viewing, re-watching, etc.), that has been viewed, watched, liked, etc. by the user and that is included in a set of content identified by crawling component 104 as content that tends to be re-viewed, re-watched, etc. In general, the recommendation component 108 employs a recommendation based in part on an observation that behavior of a group of users will likely predict behavior of an individual user related to the group. For example, where content includes videos, the recommendation component 108 at least infers that if a user watches or likes a video that tends to be re-watched by several other users, the user may have interest in re-watching the video as well. The recommendation component 108 can also apply various filters to streamline this approach to better identify videos (or other content where the content does not included videos) that a particular user may be interested in re-watching/re-viewing.

Figure 4:
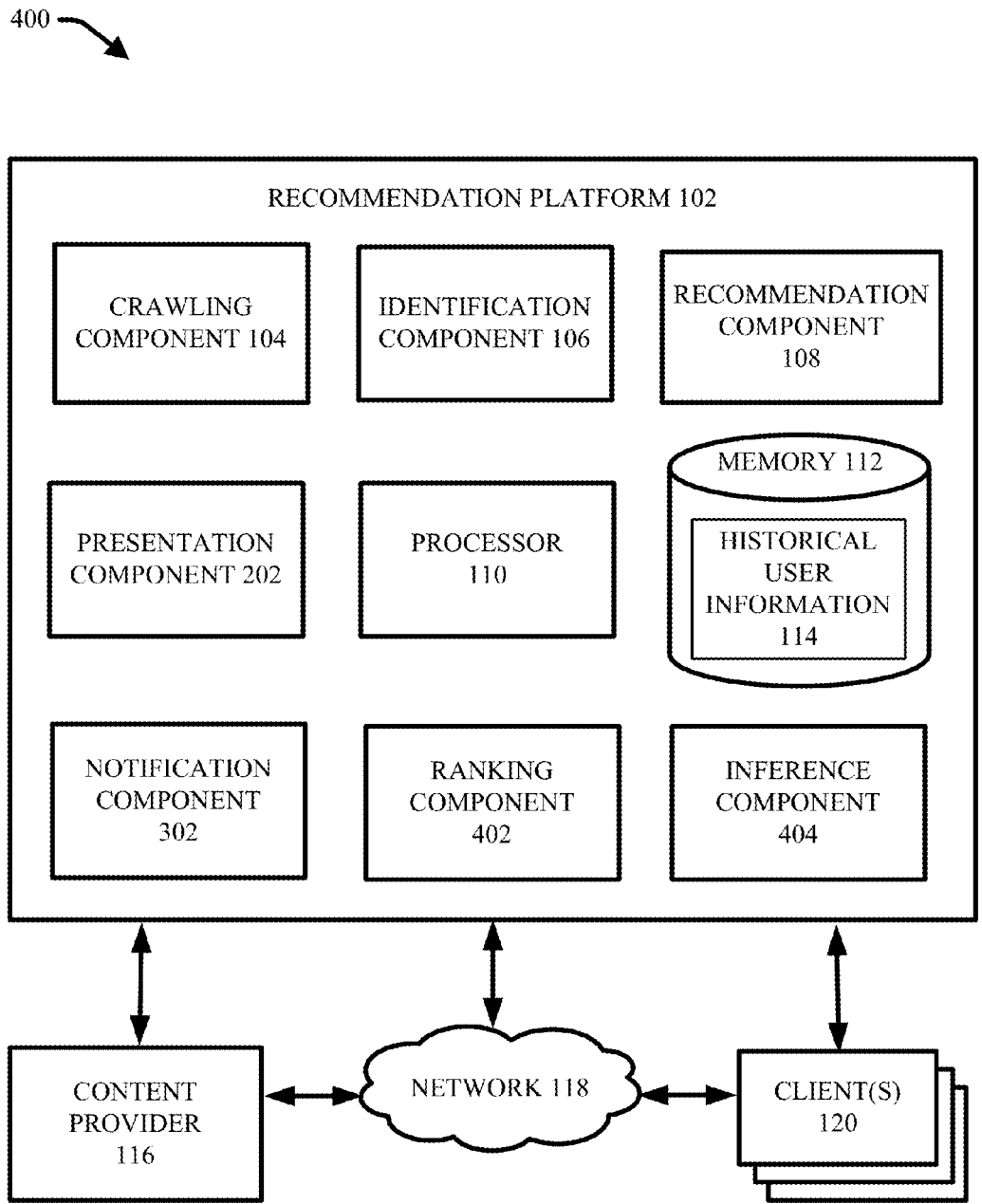
FIG. 4 illustrates another example system for recommending content based on probability that a user has interest in viewing such content again in accordance with various aspects and embodiments described herein.

For example, as described supra with respect to FIG. 4, recommendation systems disclosed herein can include a ranking component 402 that can apply various filters/algorithms to a list of content accessed, viewed, watched, etc. by a particular user that matches a set of content identified as content that is re-accessed, re-viewed, re-watched by a group of users. The filters or algorithms can apply various criteria that restrict and rank content included in the list based on factors in addition to inclusion as function of matching content viewed by the user included in a set of content that is re-viewed by a plurality of users. The recommendation component 108 can then recommend content based on a filtered list or ranking generated by the ranking component 402.

Figure 2:
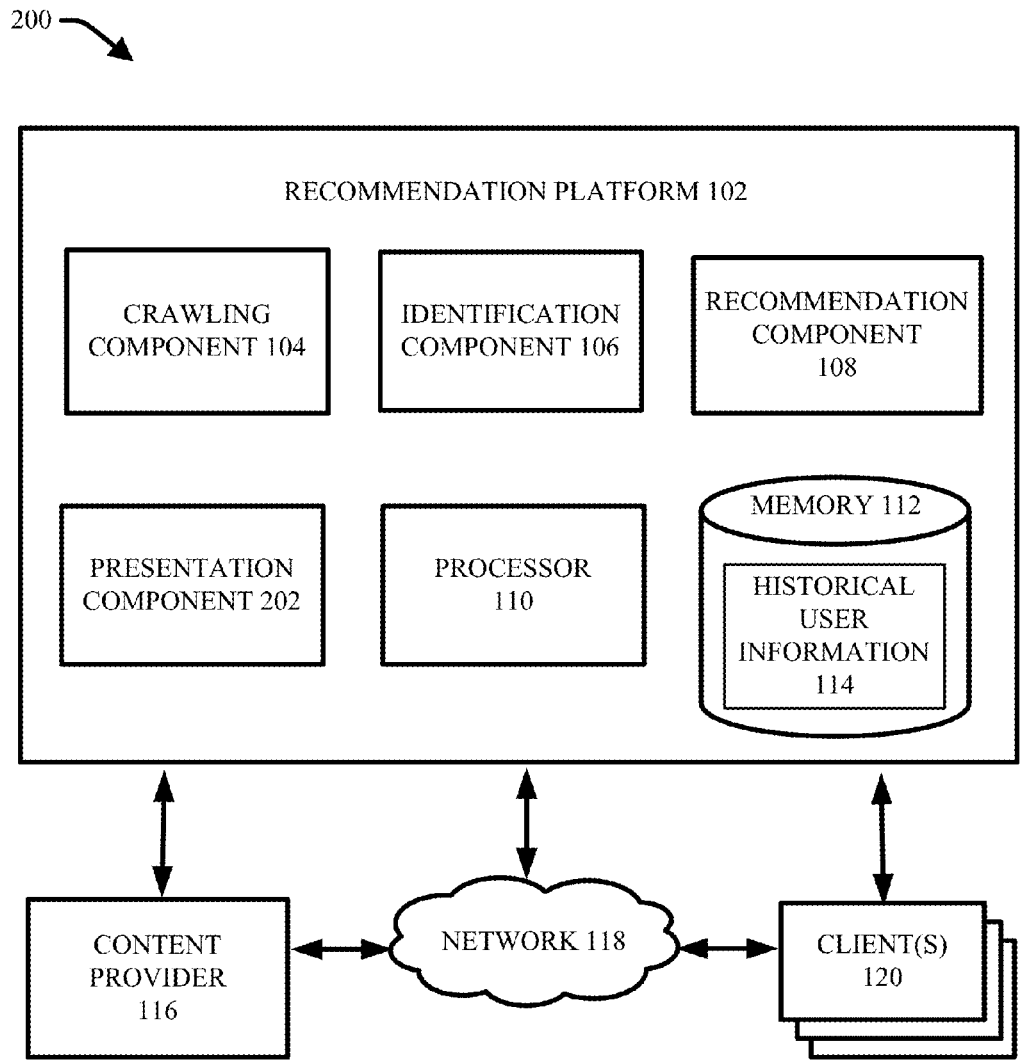
FIG. 2 illustrates another example system for recommending content based on probability that a user has interest in viewing such content again in accordance with various aspects and embodiments described herein.

Referring now to FIG. 2, presented is diagram of another example system 200 for recommending content to a user that the user previously viewed for viewing again, in accordance with various aspects and embodiments described herein. System 200 includes same features and functionalities of system 200 with the addition of presentation component 202. Repetitive description of like elements employed in respective embodiments of systems and interfaces described herein are omitted for sake of brevity.

In an embodiment, system 200 facilitates interfacing with a content provider 116 that is a streaming media provider configured to provide streaming media to a user over a network 118. For example, a streaming media provider can employ recommendation platform 102 to identify and present recommended videos to a user via a user interface displayed at a client device 120. According to this embodiment, the recommendation platform 102 can include presentation component 202 to present or display recommended media content to a user in various manners via the user interface.

For example, the user interface can present and organize media items available to a user from the streaming media provider. Presentation component 202 can generate this interface and present the media items in various forms and arrangements. For example, presentation component 202 can generate an interface with various sections such as a primary display section in which a selected video is played/presented in a video player, a subsection having thumbnail views of suggested or relevant videos for a user, another subsection of thumbnail views of popular channels, and/or a section with a streaming advertisement. A thumbnail can include a static image of a media item that represents the media item and allows the user to select and/or preview the media item. In an aspect, a user can select a video for viewing by selecting a thumbnail view of a video and the video can be presented to the user in the primary display section or a larger window of a new interface display page (as compared to the size of the thumbnail view).

In an aspect, presentation component 202 is configured to present videos identified by recommendation component 108 in a recommended videos section of a user interface. For example, as discussed infra, recommendation component 108 is configured to recommend one or more content items identified by identification component 106 as content items a user may have interest in accessing again. Where the content items are videos, the recommendation component 108 can recommend one or more videos identified by identification component 106 as videos the user may have interest in watching again. According to this example, the presentation component 202 can present these one or more recommended videos to a user in a recommendation section of a user interface as thumbnails or in a list view.

In an aspect, this recommendation section can be tailored to present only videos recommended for re-watch by the user. For example, the recommendation section can be titled as a "Watch Again," section and include recommended videos that the user has previously watched or liked for watching again. In an another aspect, the recommended videos can be included in a recommendation section or other section that includes videos recommended or presented to the user for various reasons that are not based on a history of the user with the videos. According to this aspect, a video which is recommended to the user based at least in part on user history with the video can be identified by presentation component 202 with the addition of a tag, overlay or other insignia to the thumbnail view of the video that indicates the video is recommended for re-watch. For example, these videos recommended for re-watch can be associated with text that states "Watch Again," or "Enjoy Again."

In other aspects, the presentation component 202 can present videos recommended for re-watch with, or in association with, a video presented to a user in a primary display area (e.g., a player) of a user interface. For example, the presentation component 202 can present a video recommended for re-watch as an overlay object/thumbnail within a player of the user interface as another video is played or presented to the user. In another example, the presentation component 202 can present a video recommended for re-watch as an in-screen panel that appears in the player at the end of a video (e.g., an end-cap). Still in yet another aspect, the presentation component 202 can present a video recommended for re-watch as a pop-up on the user interface. It should be appreciated that the manners for presenting a video recommended for re-watch can vary and are not limited to the above examples.

The presentation component 202 can present content viewing options for use with any suitable type of device configured to interface with a streaming media provider, for example mobile phone, tablet computer, desktop computer, server system, personal computers, cable set top box, satellite set top box, cable modem, television set, internet-enabled televisions, television computer device media extender device, video cassette recorder device, blu-ray device, DVD (digital versatile disc or digital video disc) device, compact disc device, video game system, audio/video receiver, radio device, portable music player, navigation system, car stereo, etc.

The respective devices listed above (and additional devices suitable for interfacing with a streaming media provider) often have different capabilities and limitations (e.g., screen size, decoders . . . ). In an aspect, the presentation component 202 can provide presentation options in accordance with different device capabilities or limitations. For example, data rendering capabilities may be more limited in a mobile device (e.g., a smart-phone) than in a fixed computing device (e.g., a desktop computer), more effort may be required of a user to consume content such as a video (or other information) from the mobile device than would be required of the user in viewing the same video from a fixed computing device. In addition, because displays of various mobile devices are often smaller than displays in fixed computing devices, it may be possible only to display a relatively small amount of information at any given time on a mobile device. Finally, data connections between a mobile device and various networked resources (e.g., the Internet) may be slower than corresponding data connections between a fixed computing device and the same networked resources. Accordingly, the presentation component 202 can generate user options to account for variations in device functionality and available bandwidth for consumption and rendering of media content.

In view of the above, the presentation component 202 can present content in various formats and/or in accordance with various display mediums. In particular, the presentation component 202 can adapt and optimize display options and content based on respective client devices. For example, the presentation component 202 can adapt the manner in which a video recommended for re-watch is presented to a user (e.g., as an end-cap, as a pop up, in a recommendation section, etc.) based on client device 120 capabilities and display restrictions. In another example, the presentation component 202 can present a section of video in a format such as H.263, H.264 AVC, MPEG-4 SP, VP8, or other suitable format based on the client device 120. In yet another example, the presentation component 202 can present an audio of a video in formats such as for example AAC LC/LTP, HE-AACv1 (AAC+), HE-AACv2 (enhanced AAC+), AMR-NB, AMR-WB, FLAC, MP3, MIDI, Vorbis, PCM/WAVE, etc.

In an aspect, the presentation component 202 can automatically configure or present user options to consume video based on encoding parameters such as video resolution, video frame rate, video bit rate, video codec, audio codec, audio channels, audio bit rate, etc. Thus presentation component 202 can choose a format to consume content that best suits capabilities of specific consumption mediums, available bandwidth, file size, processing capabilities, screen resolution, screen size, available encoders, available decoders, etc.

Figure 3:
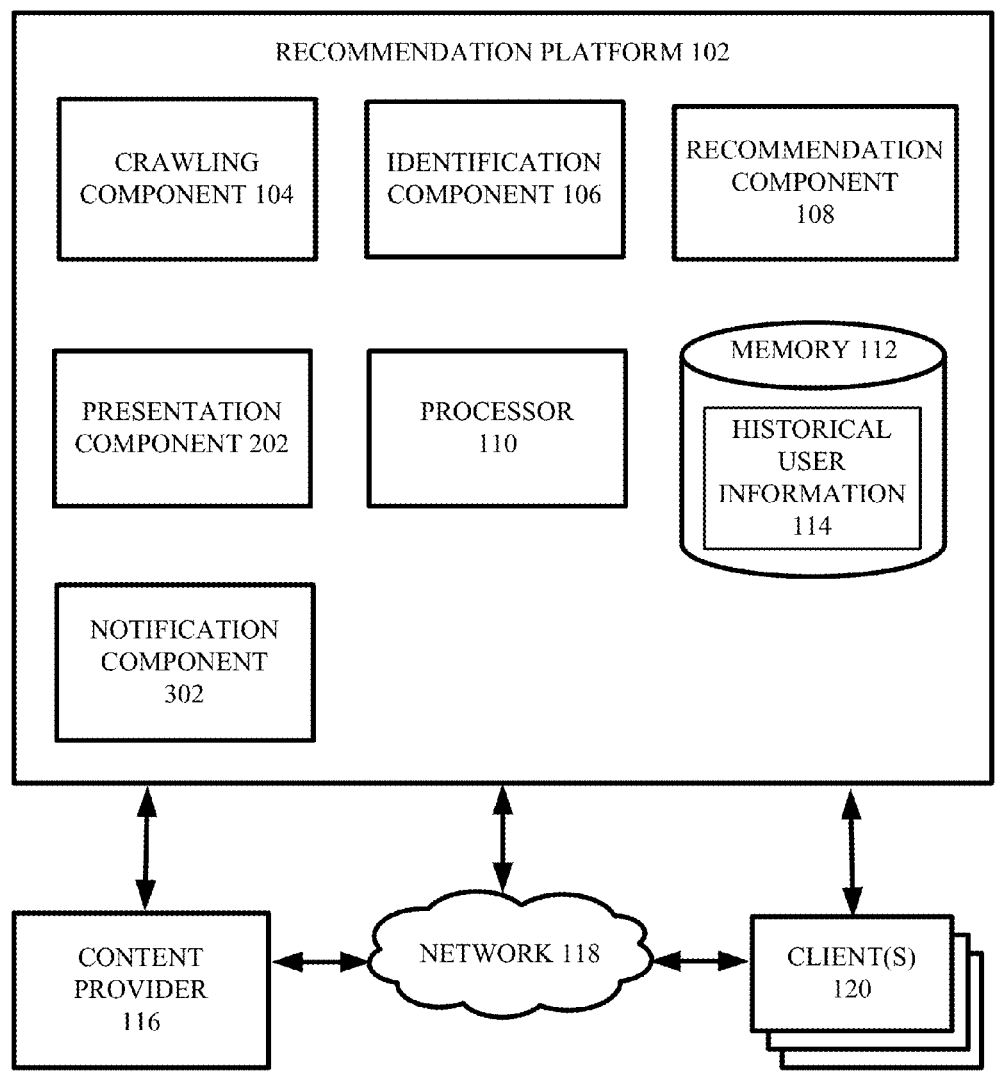
FIG. 3 illustrates another example system for recommending content based on probability that a user has interest in viewing such content again in accordance with various aspects and embodiments described herein.

Referring now to FIG. 3, presented is diagram of another example system 300 for recommending content to a user that the user previously viewed for viewing again, in accordance with various aspects and embodiments described herein. System 300 includes same features and functionalities of system 200 with the addition of notification component 302. Repetitive description of like elements employed in respective embodiments of systems and interfaces described herein are omitted for sake of brevity.

Notification component 302 is configured to notify a user when recommendation component 108 has determined/or inferred one or more content items for re-access (e.g., re-view, re-watch, re-listen to, etc.) by a user. For example, in response to a determination of one or more content items recommended for re-access by recommendation component 108, notification component 302 can generate a message with information indicating the one or more content items recommended for re-access and provide the message to the user. In an aspect, the notification component 302 can generate the message as pop up message that appears in a user interface presented at a client device 120. In another aspect, the notification component 302 can generate the message as an email. Still in yet another aspect, the notification component 302 can generate the message as a text message (e.g., a short messaging service (SMS) text message). Notification component 302 can be configured to adapt the message format based on various factors including but not limited to, preferences of a user, the content item recommended for re-access, the client device 120 employed by the user, or the degree to which the content item is considered likely to re-accessed by the user (e.g., based on a rank associated with the content item as determined by ranking component discussed supra).

Referring now to FIG. 4 presented is a diagram of another example system 400 for recommending content to a user that the user previously viewed for viewing again, in accordance with various aspects and embodiments described herein. System 400 includes same features and functionalities of system 300 with the addition of ranking component 402 and inference component 404. Repetitive description of like elements employed in respective embodiments of systems and interfaces described herein are omitted for sake of brevity.

Recommendation platform 102 can include a ranking component 402 configured to apply a ranking to content that a user previously interacted with in some manner indicating an affinity for the content, wherein the content is also included in a list/set of content generated by crawling component 104 that includes content other individual users have viewed/accessed more than once (e.g., content that tends to be re-accessed, re-viewed, re-watched, etc., by a plurality of users). The ranking applied by ranking component 402 can represent a determined or inferred probability that the user has interest in accessing (e.g., viewing, watching, listening to, reading, etc.) the content again. A ranking applied to content by ranking component 402 can further influence manner in which recommendation component 108 recommends content to a user for re-acces sing and/or how the presentation component 202 presents the content to a user for re-accessing. In another aspect, the ranking associated with content can influence how the content appears in a search query result. Still in yet another aspect (discussed supra with respect to FIG. 6), the ranking associated with content can influence association of advertisements with the content, charging schemes for the advertisements, and/or data collection regarding user consumption/interaction with the advertisements.

For example, the ranking component 402 can apply a ranking to a video included in a user's watch history or liked by the user that is also included in a set of videos identified as being re-watched by other users (e.g., by crawling component 104). The ranking can represent a probability that the user has interest in re-watching the video. The ranking can further influence whether the video is recommended to the user for re-watching as well as manner in which the recommended video is presented to the user. For example, where two or more videos are included in a user's watch history or liked by the user that are also included in a set of videos identified as being re-watched by other users, the ranking component 402 can apply respective rankings to the videos that indicate probabilities the user has interest in re-watching the respective videos. The recommendation component 108 can then recommend the two or more videos to the user for re-watching in an order based on the respective rankings associated with the videos. For example, the recommendation component 108 can recommend a video of the two or more videos having a higher ranking above a video of the two or more videos having a lower ranking.

In another example, where a ranking applied to a video included in a user's watch history or liked by the user that is also included in a set of videos identified as being re-watched by other users is above a first predetermined threshold, the recommendation component 108 can include the video in a recommendation section of a user interface that facilitates organizing, navigating and accessing a plurality of videos available for watching by the user. Where the ranking is above a second predetermined threshold (e.g., a threshold higher than the first threshold), the recommendation component 108 can recommend the video above other recommended videos (e.g., place the video at the top of a recommendation list generated by recommendation platform 102 or another recommendation system), or an auto-play component (discussed supra with respect to FIG. 5) could initiate automatic re-playing of the video. The ranking can also influence order in which the video appears in a search query result for a search based on one or more factors associated with the video. It should be appreciated that manner in which a ranking associated with a video, as assigned by the ranking component 402 affects recommendation of the video, presentation of the recommended video, ordering of the recommended video, search query inclusion of the video, auto-replay of the video, and/or advertising associated with the video, can vary and is not limited to the above examples.

The ranking component 402 can employ various algorithms (stored in memory 112 or external memory accessible to ranking component 402) that apply one or more factors, discussed below, considered reflective of a user's interest in re-accessing (e.g., re-viewing, re-watching, re-listening, re-reading, etc.) content items previously accessed (or interacted with by a user in the manners discussed herein) by the user to rank the content items. These factors can include factors that restrict content items included in a set content items identified by crawling component 104 as content items accessed (e.g., viewed, watched, etc) by at least one other user more than once. These factors can also include factors that restrict content items included in a user's history that can be considered candidates, as determined by identification component 106, for matching with content items included in the set of content items identified by crawling component 104.

In an aspect, the ranking component 402 can apply these one or more factors (e.g., via an algorithm or algorithms) to a broad subset of content items identified by identification component 106 to rank content items included in the broad subset. For example, this broad subset can include one or more content items included in a first user's history as content items interacted with by the user in a manner that indicates an affinity for the items, that match content items included in a set of content items identified by crawling component 104 as content items re-accessed (e.g., re-viewed, re-watched, etc.) by one or more other users of a plurality of users. As described herein, interaction with a content item that can indicate an affinity for the content item can include but is not limited to: accessing the content item, viewing the content item, playing the content item, watching the content item, marking the content item as liked, commenting on the content item, sharing the content item with another user, placing the content item in saved folder/file (e.g., a favorites folder, a watch later folder, etc.), copying the content item, or downloading the content item.

In another aspect, crawling component 104 can be configured to apply one or more filters (e.g., algorithms that filter based on factors described below reflective of a user's interest in re-accessing content items) to restrict the list of content items included in a set of content items that tend to be re-accessed by user in general. For example, crawling component 104 can identify a set of content items that are re-accessed by at least 30% of other users. The identification component 106 can also apply one or more algorithms to restrict the list of videos in a user's history that can be candidates for matching with the content items included in a set identified by crawling component 104. For example, the identification component 106 can identify content items included in a user's history that have been accessed by the user over the last week that match content items included in the set identified by crawling component 104. According to this aspect, the ranking component 402 can be provided with a streamlined list/set (as opposed to a broad list/set) of content items identified by identification component 106 for which to apply any additional filters/factors to rank the content items.

Examples of various factors or filters that the crawling component 104 and/or identification component 106 can employ to filter sets/subsets of identified content items, and/or the ranking component 402 can employ to rank content items identified by identification component 106 are listed below as items 1-8. The ranking applied to a content item by the ranking component 402 as a function of one or more of these factors/filters reflects probability that the user has interest in re-accessing the content item again.

1. Type of Content.

In an aspect, ranking component 402 can select an algorithm to apply for ranking content items based on the type of content. For example, different algorithms can be employed by ranking component 402 depending on the type of content. The different algorithms can include factors and weights to apply to those factors based on the type of content. For example, where the content is videos, the algorithm for ranking a video to reflect a user's interest in re-watching the video can weigh a user's history of watching a video higher than the user's history for liking a video. In another example, where the content is text articles, historical user actions related to the user extracting and posting quotes from the article can be included as a factor in a algorithm employed by ranking component 402, whereas if the content is pictures, such a factor would not apply.

2. Number of Other Users Who Re-Accessed.

In an aspect, ranking component 402 can rank content items identified by the identification component 106 based in part on the number of other users who re-accessed (e.g., re-viewed, re-watched, re-listened, etc.) the respective content items. For example, a user's history can indicate that the user has watched or liked video ABC. Video ABC can also be included in a set of videos identified by the crawling component 104 as videos re-watched by at least one other user. The ranking component 402 can determine the number of user's who re-watched the ABC video and rank the ABC video to reflect a probability that the user has an interest in re-watching the ABC video as a function of the number of other user's who re-watched the ABC video. For example, the ranking component 402 can associate a higher ranking with the ABC video if 10,000 other user's re-watched it as opposed to 10. In another example, the ranking component 402 can apply a threshold whereby at least X number of other users have re-watched video ABC before video ABC can be considered (as a function of the ranking assigned thereto) a candidate video the user would have interest in re-watching.

3. Average Number of Times Other Users Re-Accessed.

In an aspect, ranking component 402 can rank content items identified by the identification component 106 based in part on an average number of times other users re-accessed (e.g., re-viewed, re-watched, re-listened, etc.) the respective content items. For example, a user's history can indicate that the user has watched or liked video ABC. Video ABC can also be included in a set of video identified by the crawling component 104 as videos re-watched by at least one other user. The ranking component 402 can determine average number of times other users re-watched the ABC video and rank the ABC video to reflect probability that the user has interest in re-watching the ABC video as a function of average number of times the other user's re-watched the ABC video. For example, the ranking component 402 can associate a higher ranking with the ABC video if the average number of times other users re-watched the ABC video is two times as opposed to a single time.

4. Time and Frequency of Re-Access by Others.

In an aspect, ranking component 402 can rank content items identified by the identification component 106 based in part on time and frequency associated with re-access (e.g., re-view, re-watch, re-listen, etc.) of the respective content items by others. According to this aspect, the time or time period of re-access of content by others can be considered relevant to a user's interest in re-access because it can be assumed that a user would be more interested in content items that have been re-accessed by other users within a recent time frame as opposed to a less recent time frame. For example, a user's history can indicate that the user has watched or liked video ABC and video XYZ. Videos ABC and XYZ can also be included in a set of videos identified by the crawling component 104 as videos re-watched by at least one other user. The ranking component 402 can determine however that video ABC was re-watched by at least one other user (e.g., re-watched by other users in general) over a year ago while video XYZ was re-watched by at least one other user within the past week. The ranking component 402 can then rank the ABC video and the XYZ video based on time frame associated with re-watch by other users to reflect probability that the user has an interest in re-watching the ABC video and the XYZ video. For example, the ranking component 402 can associate a higher ranking with the XYZ video as opposed to the ABC video.

In addition to merely time or time frame associated with re-access by other users, the ranking component 402 can rank content items identified by the identification component 106 based in part on and frequency associated with re-access (e.g., re-view, re-watch, re-listen, etc.) of the respective content items by others within the respective time period. According to this aspect, ranking component 402 can associate a ranking with content items identified by the identification component 106 that is influenced by current popularity of the respective content items. This factor is based on an assumption that a user would have more interest in re-accessing content that is frequently being re-accessed by a plurality of other users within a current or recent time frame. For example, ranking component 402 can rank content items higher that are being more frequently re-accessed as opposed to content items that are being less frequently re-accessed.

In an aspect, in order to calculate frequency of re-access, the ranking component 402 can examine number of times a particular video was re-accessed in a predetermined timeframe (e.g., within the past hour, day or week as opposed to within the past year). The ranking component 402 can also compare frequency of re-access within a recent time-frame with frequency of re-access over past time frames to determine whether the frequency of re-access is increasing or decreasing. The ranking component 402 can associate a higher ranking with content items that are associated with an increasing frequency of re-access (e.g., content items increasing in popularity) as opposed to content items associated with decreasing frequency of re-access (e.g., content items decreasing in popularity).

For example, a user's history can indicate that the user has watched or liked video ABC and video XYZ. Videos ABC and XYZ can also be included in a set of videos identified by the crawling component 104 as videos re-watched by at least one other user. The ranking component 402 can determine however that video ABC was re-watched at a frequency of about 50 times in the past year by at least one other user (e.g., re-watched by other users in general) while video XYZ was re-watched by at least one other at a frequency of about 50 times in the past week. The ranking component 402 can then rank the ABC video and the XYZ video based on the frequency of re-watch by other users, and the respective time periods or re-watch by other user's, to reflect a probability that the user has an interest in re-watching the ABC video and the XYZ video. For example, the ranking component 402 can associate a higher ranking with the XYZ video as opposed to the ABC video.

5. Relatedness of the Other Users to the User.

In an aspect, ranking component 402 can rank content items identified by the identification component 106 based in part on relatedness of a first user, for which the content items are identified for recommendation for re-access, to other users that previously re-accessed the content items. According to this aspect, ranking component 402 can analyze the various other users that previously re-accessed the content items to identify characteristics of those users. Such characteristics can relate to but are not limited to: user demographics, preferences of users, or social circles the users are associated with. The ranking component 402 can further determine or infer characteristics of the first user, including demographic information for the first user, preferences of the first user, and/or social circles of the first user. The ranking component 402 can then rank a content item included in the first user's history as a function of relatedness of the first user to the other users that previously re-accessed the content item.

In particular, where the first user shares similarities with other users that previously re-accessed the content item, the ranking component 402 can infer that the first user would have a greater interest in re-accessing the content item as opposed to a scenario where the first user shares very few if any similarities with the other users that previously re-accessed the content item. The ranking component 402 can therefore associate higher ranking to a content item when the first user shares similarities with other users that previously re-accessed the content item and a lower ranking to a content item when the first user share' very few if any similarities with the other users that previously re-accessed the content item. According to this aspect, degree of similarities between the first user and the other users can further influence ranking.

For example, the crawling component 104 can identify a set of videos that have been re-watched by a plurality of users. The identification component 106 can identify a video, video ABC included in a first user's watch history that is also included in the set of videos. In an aspect, the recommendation component 108 can then recommend video ABC to the first user for re-watch. In another aspect, for example, the ranking component 402 can examine those users of the plurality of users that re-watched video ABC and determine that 75% of them are female, 90% of them are below the age of 18, and 30% of them enjoy sport fishing. The recommendation component 108 can then examine characteristics of the first user to determine that the first user is a 16 year old female who hates fish and anything to do with fishing. Based on similarities between the other users that re-watched video ABC and the first user, the ranking component 402 can associate a relatively high ranking with ABC which reflects a strong inclination that the first user would be interested in re-watching video ABC. According to this aspect, the ranking component 402 can adjust ranking of a video based on degree of similarity between a user who watched a video and other users that re-watched the video.

In another aspect, crawling component 104 can be configured to generate sets of videos respectively re-accessed by clusters of users associated with particular characteristics. The identification component 106 can then examine a set of the sets of videos that is associated with users exhibiting similar characteristics to a first user when identifying matches between videos included in the first user's watch/like history that have been previously re-watched by other users. For example, rather than generating a set of videos that have be re-watched by a plurality of users, the crawling component 104 can generate sets of videos that have be respectively re-watched by specific clusters of users associated with particular characteristics related to a first user. For example, the crawling component 104 can identify a set of videos that have been re-watched by a plurality of females under the age of 18. Where a first user is a 16 year old female, the identification component 106 can examine the set of videos to identify a video included in the set of videos that is also included in the first user's watch history.

6. Manner and Degree of Interaction with Content by the User.

In an aspect, ranking component 402 can rank content items identified by the identification component 106 based in part on manner and degree of interaction with the content items by the first user for which the content items are identified for recommendation for re-access. In particular, a user's historical information 114 can include various indicators of a user's affinity for a particular content item in addition to accessing or viewing the item. For example, a user may be able to view a link to content, view a summary of content, access content and view the content, access content and play the content (e.g., where the content includes video or audio), view content and provide comments on the content, view content and mark the content with an indication that the user likes or dislikes the content, view the content and share the content with another user (e.g., via posting a link to the content, emailing a link to the content, etc.), view the content and download or store the content, save or generate a reference locator for the content, etc.

In an aspect, manner and degree of interaction with content can influence probability the user would have interest in accessing/viewing the content again. For example, identification component 106 can identify content items included in a user's history that the user has interacted with in any of the manners described above and which are also included in a set of content items identified by crawling component 104 as content items that have be re-accessed by a plurality of users. The ranking component 402 can then apply a ranking to the respective content items as a function of the user's manner and degree of interaction with the respective content items. For example, a first video that a user views, shares a link to, and provides commentary on can be considered more interesting to the user as compared to a second video a user views a summary of and merely saves for viewing later. According to this example, the ranking component 402 can be configured to apply a higher ranking to the first video compared to the second video.

7. Number of Times of Re-Access by the User.

In an aspect, ranking component 402 can rank content items identified by the identification component 106 based in part on number of times of re-access of the content items by the user for whom the content items are being identified for recommendation for re-access. For example, the crawling component 104 can identify a set of content items that tend to be re-accessed by a plurality of users. The identification component 106 can then identify a content item included in a first user's history that was accessed at least once by the first user that is also included in the set. The recommendation component 108 can then recommend the matching content item to the first user for re-access.

However, in some aspects, a user's history will indicate that the user has already re-accessed the content item. For example, rather than accessing the content item once before, the first user may have accessed the content item twice before, three times before, four times before, etc. According to this aspect, the ranking component 402 can infer that the greater amount of re-access of the content item by the user in the past, the more likely the user would be interested in re-accessing the content item in the future. Thus the ranking component 402 can apply a higher ranking to content items included in the first user's history as a function of the number of times the first user has accessed the content item.

8. Time of Interaction with Content by the User.

In an aspect, ranking component 402 can rank content items identified by the identification component 106 based in part on a time of access the content items by the user for whom the content items are being identified for recommendation for re-access. For example, the crawling component 104 can identify a set of content items that tend to be re-accessed by a plurality of users. The identification component 106 can then identify a content item included in a first user's history that was accessed at least once by the first user that is also included in the set. The ranking component 402 can further rank the content item to reflect a degree of likelihood that the first user would be interested in re-accessing the content item again as a function of time the first user accessed the content item.

For example, the ranking component 402 can consider a content item that was accessed by the first user within the past week as a better candidate for recommendation of re-access compared to a content item that was accessed by the first user a year ago. Thus the ranking component 402 can associate higher rankings with content items that have been accessed (or interacted with in a manner discussed above that indicates an affinity for the item) more recently than others.

Referring back to FIG. 4, the recommendation platform 102 can further include inference component 404 to provide for or aid in various inferences or determinations associated with aspects of crawling component 104, identification component 106, recommendation component 108 and ranking component 402. In an aspect, all or portions of recommendation platform can be operatively coupled to inference component 404. Moreover, inference component 404 may be granted access to all or portions of recommendation platform 102, service provider(s) 116 external information sources/systems (not shown), and client devices 120.

In an aspect, inference component 404 can facilitate inferring a ranking for a video by ranking component 402 (e.g., inferring a probability that the user has an interest in re-watching the video). For example, inference component 404 can apply one or more of the above factors to content items, such as videos, identified by identification component 106, to infer a degree/probability of likelihood of re-access or re-watch by a user. The inference component 404 can further infer whether and how to recommend and present content items to a user for re-watch based on ranking information associated therewith. For example, the inference component 404 can infer whether to recommend a video to a user for re-watch based on the ranking associated therewith. In another example, inference component 404 can infer how to order a video recommended for re-watch amongst other videos recommended to the user in a recommendation section of a user interface based in part on a ranking associated therewith.

In order to provide for or aid in the numerous inferences described herein, inference component 404 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 5:
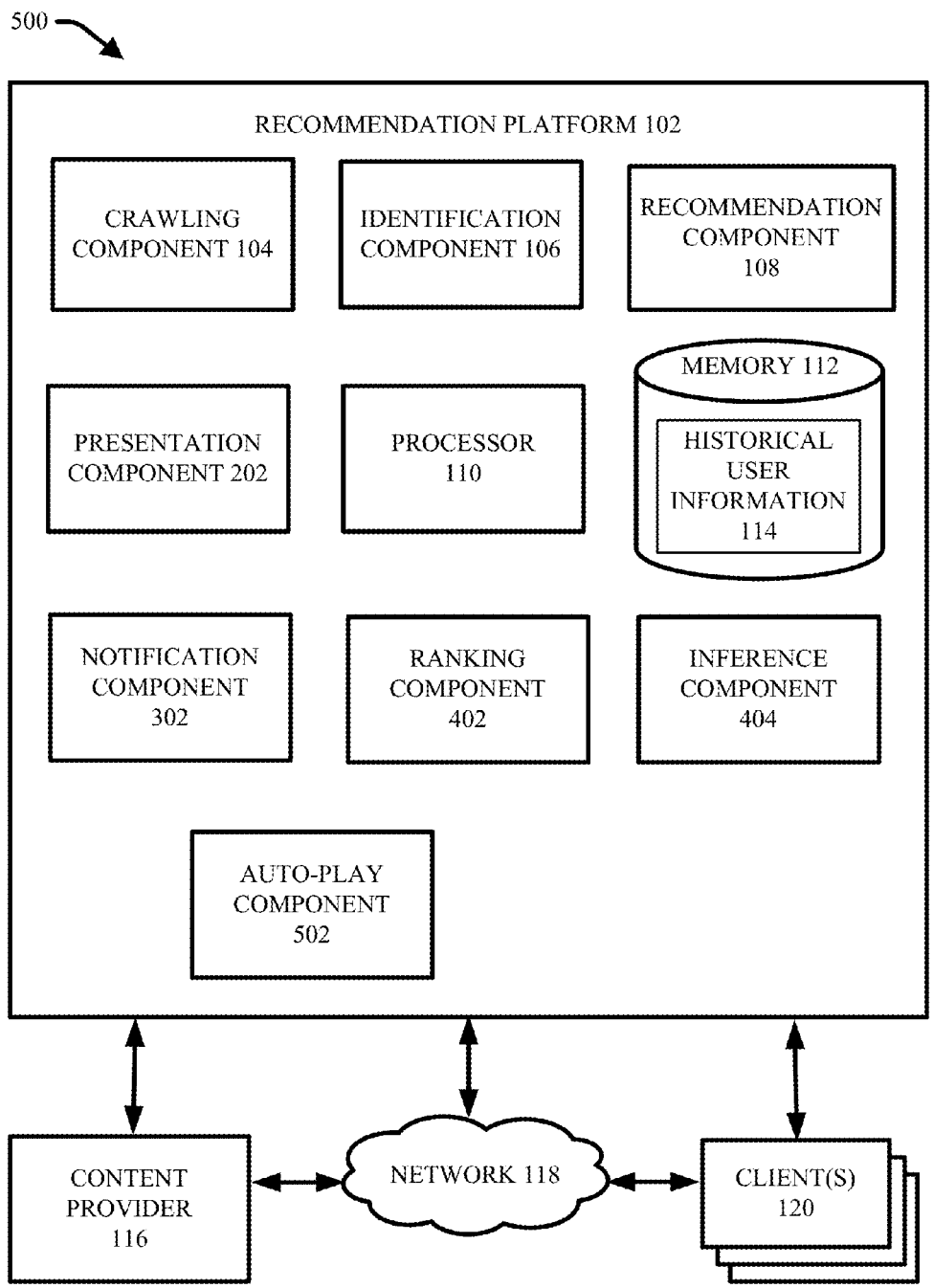
FIG. 5 illustrates another example system for recommending content based on probability that a user has interest in viewing such content again in accordance with various aspects and embodiments described herein.

FIG. 5 presents a diagram of another example system 500 for recommending content to a user that the user previously viewed for viewing again, in accordance with various aspects and embodiments described herein. System 500 includes same features and functionalities of system 400 with the addition of auto-play component 502. Repetitive description of like elements employed in respective embodiments of systems and interfaces described herein are omitted for sake of brevity.

Auto-play component 502 is configured to automatically replay a media item, such as a video or audio track, in response to a determination by recommendation component 108 for recommendation of re-access (e.g., re-watch or re-listen to) of the media item. For example, in response to identification by the identification component 106 and/or recommendation component 108 of a video that a user may have an interest re-watching, the auto-play component 502 can automatically play the video in a media player of a user interface at a client device 120 employed by the user. In an aspect, the auto-play component 502 can be configured to automatically re-play a media item in response to a determination/inference by ranking component 402 and/or inference component 404 that the media item has a high probability of re-watch/re-listen by the user. According to this aspect, the auto-play component 502 can be configured to automatically reply a video or audio track in response to association of a ranking with the video or audio track that is above a predetermined threshold. For example, the auto-play component 502 can be configured to automatically replay videos that have a 90% probability of re-watch by a user (e.g., based on the various factors discussed herein).

In an aspect, the auto-play component 502 is configured to initiate the automatic replay of a video or audio track as a function of user context or user preferences. According to this aspect, the inference component 404 can infer user context and/or user preferences. In other aspects, user preferences can be provided to recommendation platform 102 by user. User context can relate information including but not limited to, a user's physical location, a user's physical surroundings, a user's current activities, and time of day. For example, where the recommendation component 108 identifies a sports match video as having a high probability of re-watch for a particular user, the auto-play component 502 can choose to automatically replay the video when the user is travelling to attend a similar sports match as opposed to a time when the user is attending church.

Figure 6:
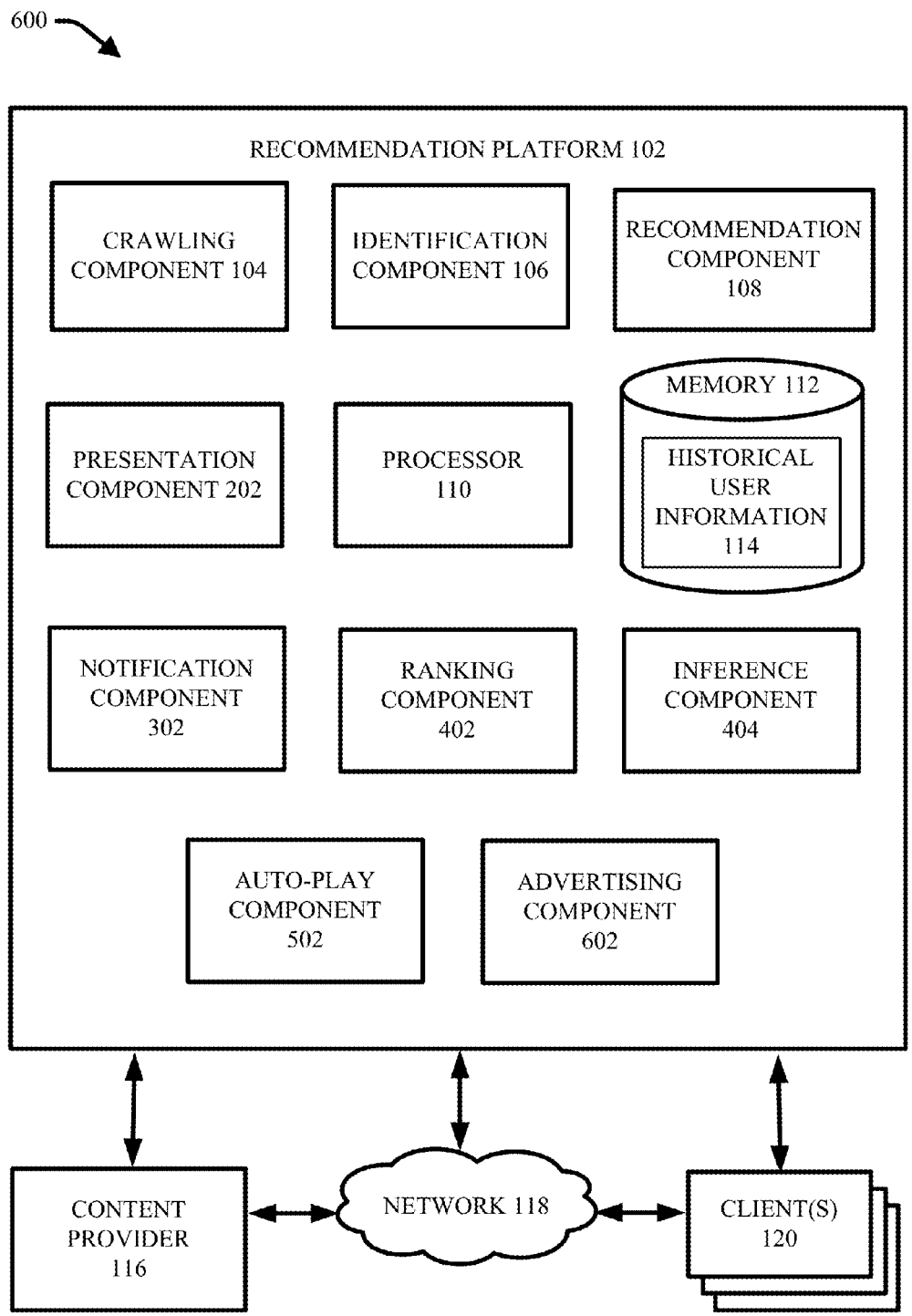
FIG. 6 illustrates another example system for recommending content based on probability that a user has interest in viewing such content again in accordance with various aspects and embodiments described herein.

FIG. 6 presents another diagram of another example system 600 for recommending content to a user that the user previously viewed for viewing again, in accordance with various aspects and embodiments described herein. System 600 includes same features and functionalities of system 500 with the addition of advertising component 602. Repetitive description of like elements employed in respective embodiments of systems and interfaces described herein are omitted for sake of brevity.

Advertising component 602 is configured to provide advertisements (ads) to users. These advertisements can include video ads, text ads, picture ads, audio ads, etc. In some aspects, the advertisements are associated with content re-accessed by users. In other aspects, the content re-accessed by a user is an advertisement.

In an aspect, the advertising component 602 can identify ads best suited for association with content recommended for re-viewing based on learned factors regarding user interest in ads associated with the content at a prior viewing. For example, the advertising component 602 can select a new ad to associate with content recommend for re-viewing where the user did not show interest (e.g., click on, watch for a predetermined period of time, take action regarding the purpose of the add such as purchase the product advertised in the ad, etc.). In another example, where a user showed interest in a particular advertisement in the past, the advertising component can chose to show similar ads with the content when recommended for re-viewing by the user. According to this aspect, the advertising component 602 can select ads to associate with content recommended for reviewing based in part on probability of advertisement conversion during user re-watch.

In another aspect, the advertising component 602 can prioritize ad placement with content recommended for re-viewing based in part on an inferred/determined user interest level in the content, where the user interest level is based in part on degree of likelihood a user will re-view the content. For example, when ranking component 402 associates a ranking with content that reflects a high probability the user with re-view the content, the advertising component 602 can choose to place high quality ads with the content recommended for re-access. Similarly, advertising component 602 can choose to associate ads that have been purchased at a higher premium in exchange for premium placement with content that tends to be re-accessed by users and has been recommended to a particular user for re-access.

It should further be appreciated that advertising component 602 can associate ads with content recommended for re-view by a user as a function of user preferences. For example, where an advertisement is targeted for an audience of young girls who like horses and a video is recommended for re-view by a user who fall under that description, advertising component 602 can predict with a higher probability that a user of the desired audience will view the advertisement (e.g., because the user will likely re-view the content which the ad is associated with).

Figure 7:
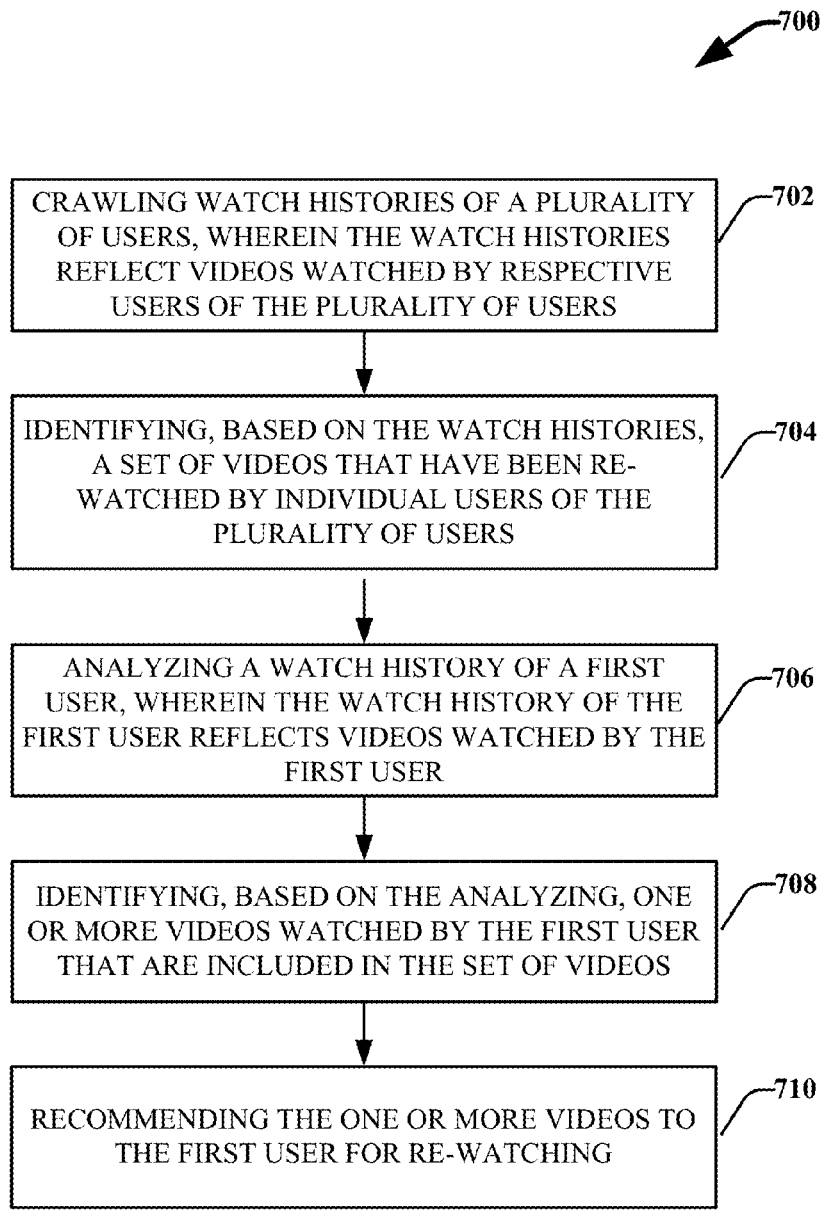
FIG. 7 is a flow diagram of an example method for recommending content based on probability that a user has interest in viewing such content again in accordance with various aspects and embodiments described herein.
Figure 8:
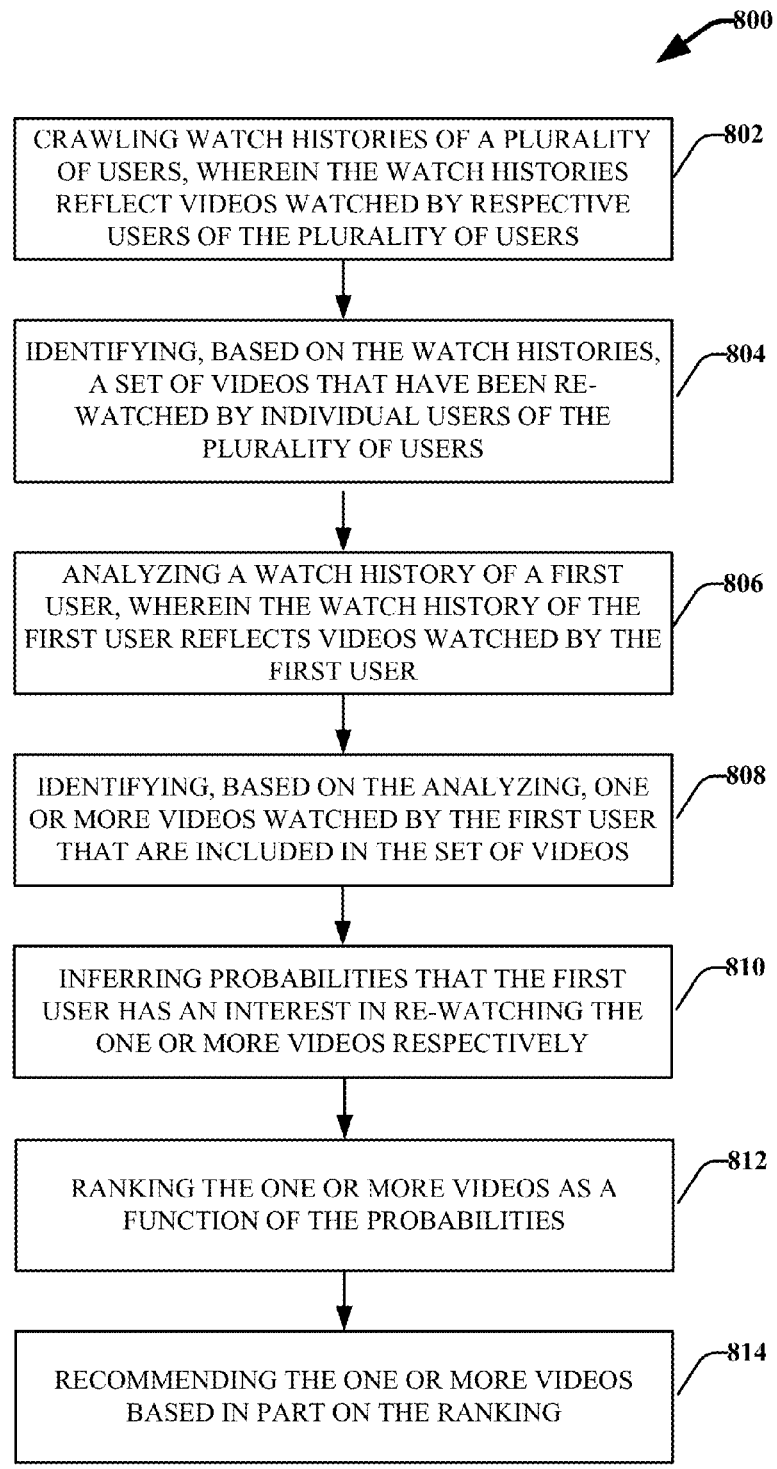
FIG. 8 is a flow diagram of another example method for recommending content based on probability that a user has interest in viewing such content again in accordance with various aspects and embodiments described herein.
Figure 9:
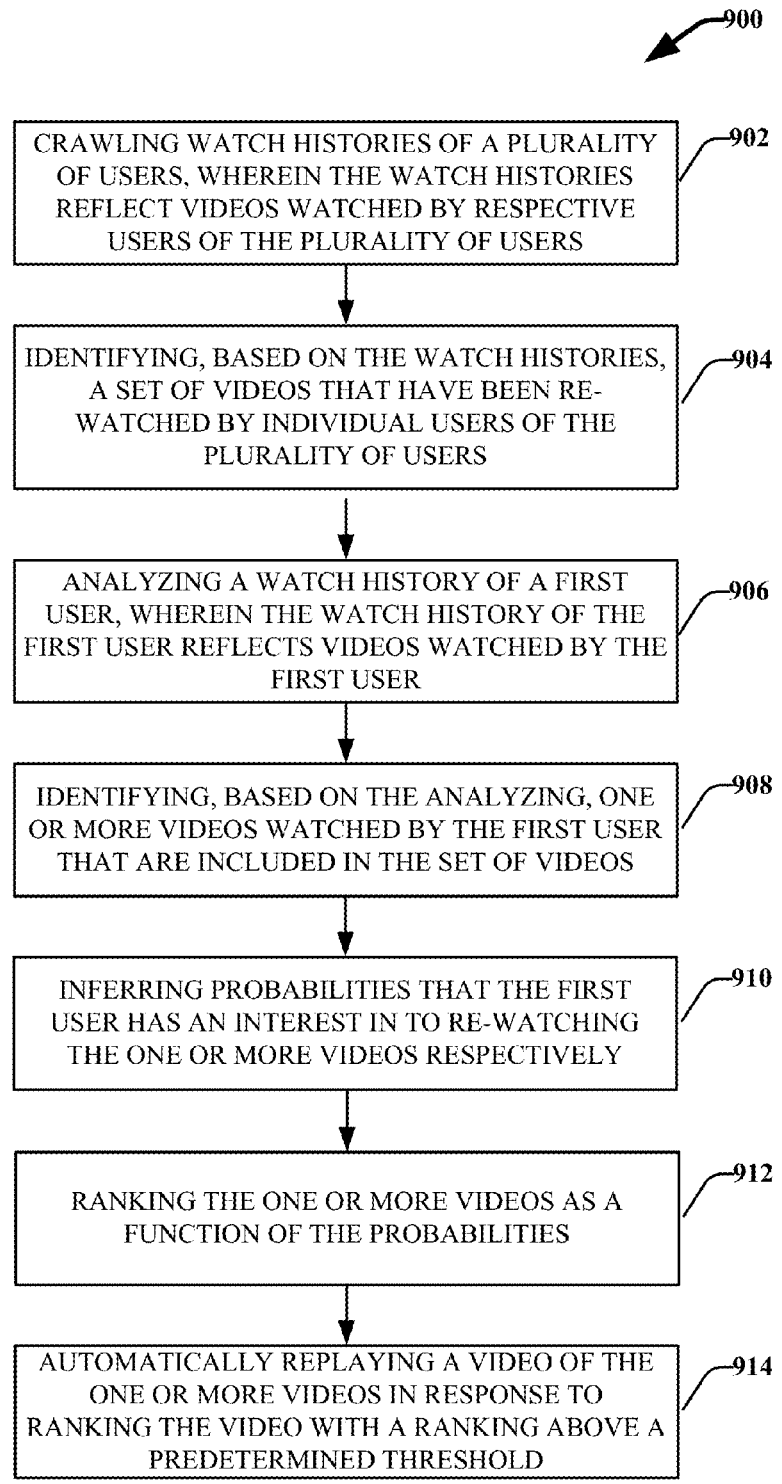
FIG. 9 is a flow diagram of another example method for recommending content based on probability that a user has interest in viewing such content again in accordance with various aspects and embodiments described herein.

In view of the example systems and/or devices described herein, example methods that can be implemented in accordance with the disclosed subject matter can be further appreciated with reference to flowcharts in FIGS. 7-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 7 illustrates a flow chart of an example method 700 for recommending videos to a user that the user previously viewed for viewing again, in accordance with aspects described herein. At 702, watch histories of a plurality of users are crawled (e.g., using a crawling component 104). The watch histories reflect videos watched by respective users of the plurality of users. At 704, a set of videos that have been re-watched by individual users of the plurality of users are identified based on the watch histories (e.g., using a crawling component 104). At 706, a watch history of a first user is analyzed (e.g., using identification component 106). The watch history of the first user reflects videos watched by the first user. At 708, one or more videos watched by the first user that are included in the set of videos are identified based on the analysis (e.g., using identification component 106). At 710, the one or more videos are recommended to the first user for re-watching (e.g., using recommendation component 108).

FIG. 8 illustrates a flow chart of another example method 800 for recommending videos to a user that the user previously viewed for viewing again, in accordance with aspects described herein. At 802, watch histories of a plurality of users are crawled (e.g., using a crawling component 104). The watch histories reflect videos watched by respective users of the plurality of users. At 804, a set of videos that have been re-watched by individual users of the plurality of users are identified based on the watch histories (e.g., using a crawling component 104). At 806, a watch history of a first user is analyzed (e.g., using identification component 106). The watch history of the first user reflects videos watched by the first user. At 808, one or more videos watched by the first user that are included in the set of videos are identified based on the analysis (e.g., using identification component 106). At 810, probabilities that the first user has an interest in re-watching the one or more videos, respectively, are inferred (e.g., using inference component 404 and/or ranking component 402). At 812, the one or more videos are ranked as a function of the respective probabilities (e.g., using inference component 404 and/or ranking component 402). Then at 814, the one or more videos are recommended to the first user for re-watching based in part on the ranking (e.g., using recommendation component 108).

FIG. 9 illustrates a flow chart of another example method 900 for recommending videos to a user that the user previously viewed for viewing again, in accordance with aspects described herein. At 902, watch histories of a plurality of users are crawled (e.g., using a crawling component 104). The watch histories reflect videos watched by respective users of the plurality of users. At 904, a set of videos that have been re-watched by individual users of the plurality of users are identified based on the watch histories (e.g., using a crawling component 104). At 906, watch history of a first user is analyzed (e.g., using identification component 106). The watch history of the first user reflects videos watched by the first user. At 908, one or more videos watched by the first user that are included in the set of videos are identified based on the analysis (e.g., using identification component 106). At 910, probabilities that the first user has an interest in re-watching the one or more videos, respectively, are inferred (e.g., using inference component 404 and/or ranking component 402). At 912, the one or more videos are ranked as a function of the respective probabilities (e.g., using inference component 404 and/or ranking component 402). Then at 914, a video of the one or more videos is automatically replayed in response to ranking the video with a ranking above a predetermined threshold (e.g., using auto-play component 502).

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 10:
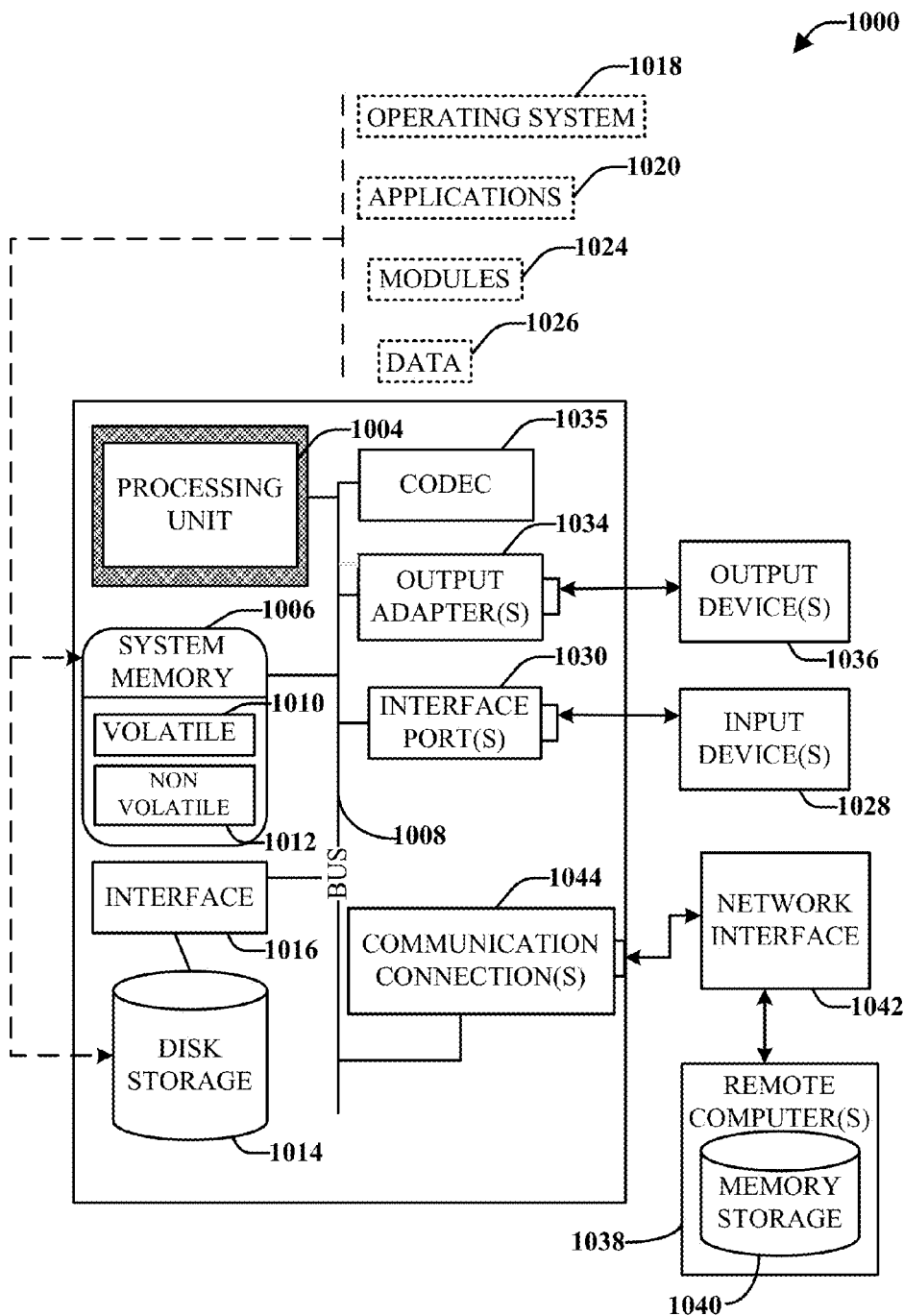
FIG. 10 is a schematic block diagram illustrating a suitable operating environment in accordance with various aspects and embodiments.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 13104), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1005 may include at least one of an encoder or decoder, wherein the at least one of an encoder or decoder may consist of hardware, a combination of hardware and software, or software. Although, codec 1005 is depicted as a separate component, codec 1005 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s). Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
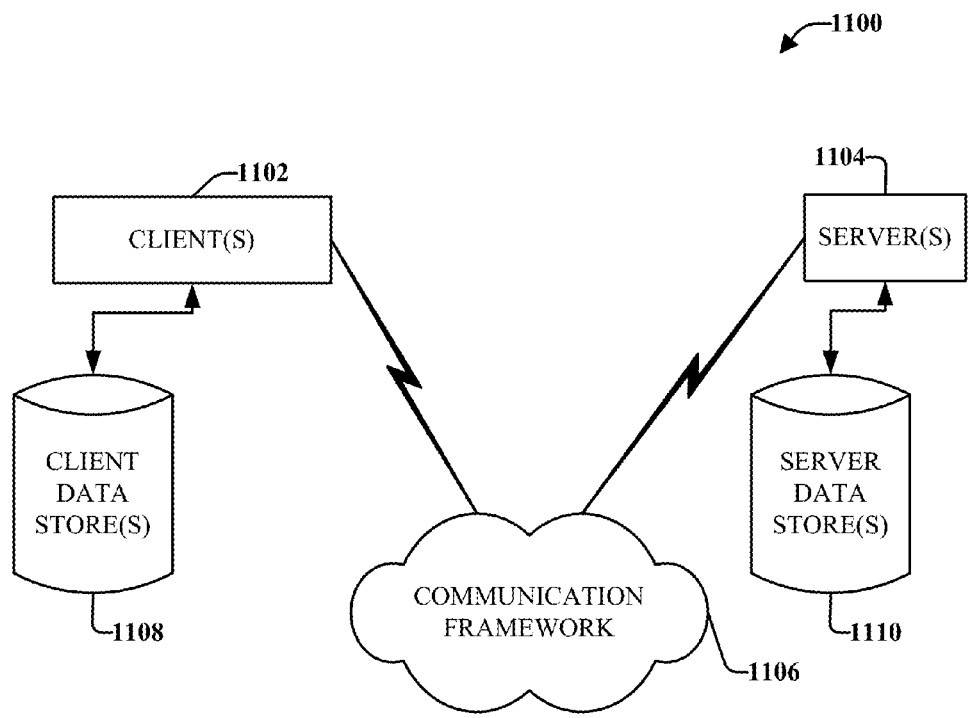
FIG. 11 is a schematic block diagram of a sample-computing environment in accordance with various aspects and embodiments.

Referring now to FIG. 11, there is illustrated a schematic block diagram of a computing environment 1100 in accordance with this disclosure. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a metadata, e.g., associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 include or are operatively connected to one or more client data store(s) 1108 that can be employed to store information local to the client(s) 1102 (e.g., associated contextual information). Similarly, the server(s) 1104 are operatively include or are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
   a processor; and
   a memory communicatively coupled to the processor, the memory having stored therein computer-executable instructions, comprising:
      an identification component configured to analyze a watch history of a user, wherein the watch history of the user reflects videos watched by the user;
      a crawling component configured to crawl watch histories of a plurality of other users, wherein the watch histories reflect videos watched by respective other users of the plurality of other users, and identify based on the watch histories a set of videos that have been re-watched over a threshold number of times by individual other users of the plurality of other users;
      wherein the identification component is further configured to identify based on the watch history of the user, one or more videos watched by the user that are included in the set of videos that have been re-watched over the threshold number of times by the individual other users of the plurality of other users; and
      a recommendation component configured to recommend the one or more videos to the user for re-watching.

2. The system of claim 1, wherein the identification component is further configured to identify one or more videos the user expressed a liking for that are included in the set of videos, and wherein the recommendation component is further configured to recommend the one or more videos the user expressed a liking for that are included in the set of videos to the user for re-watching.

3. The system of claim 1, further comprising a presentation component configured to present the one or more videos to the user as thumbnails via a user interface.

4. The system of claim 1, further comprising a presentation component configured to present the one or more videos to the user as an overlay associated with a video presented to the user via user interface.

5. The system of claim 1, further comprising a notification component configured to generate a text or audio based notification representing a recommendation to re-watch the one or more videos.

6. The system of claim 1, further comprising a ranking component configured to associate respective ranking information with the one or more videos based on respective probabilities that the user will re-watch respective videos of the one or more videos, wherein the respective probabilities are determined based in part on frequency with which the respective videos of the one or more videos have been re-watched by the individual other users of the plurality of other users, wherein the recommendation component is configured to recommend the one or more videos based in part on the ranking information.

7. The system of claim 1, further comprising a ranking component configured to associate respective ranking information with the one or more videos based on respective probabilities that the user will re-watch respective videos of the one or more videos, wherein the respective probabilities are determined based in part on a number of times the user re-watched the respective videos of the one or more videos, wherein the recommendation component is configured to recommend the one or more videos based in part on the ranking information.

8. The system of claim 1, further comprising a ranking component configured to associate respective ranking information with the one or more videos based on respective probabilities that the user will re-watch respective videos of the one or more videos, wherein the respective probabilities are determined based in part on a recency with which the respective videos of the one or more videos were watched by the user, wherein the recommendation component is configured to recommend the one or more videos based in part on the ranking information.

9. The system of claim 1, further comprising a ranking component configured to associate respective ranking information with the one or more videos based on respective probabilities that the user will re-watch respective videos of the one or more videos, wherein the respective probabilities are determined based in part on numbers of times the respective videos of the one or more videos have been re-watched by the individual other users of the plurality of users, wherein the recommendation component is configured to recommend the one or more videos based in part on the ranking information.

10. The system of claim 1, further comprising a ranking component configured to associate the respective ranking information with the one or more videos based on respective probabilities that the user will re-watch respective videos of the one or more videos, wherein the respective probabilities are determined based in part on a preference of the user or a demographic characteristic of the user, wherein the recommendation component is configured to recommend the one or more videos based in part on the ranking information.

11. The system of claim 1, further comprising a ranking component configured to associate respective ranking information with the one or more videos based in part on a number of other users included in the plurality of other users.

12. The system of claim 1, further comprising an auto-play component configured to automatically replay at least one of the one or more videos.

13. The system of claim 1, further comprising an advertising component that associates an advertisement with the one or more videos based in part on probability of advertisement conversion during first user re-watch.

14. A system, comprising:
a memory having stored thereon computer executable components;
a processor that executes at least the following computer executable components:
  a crawling component configured to crawl watch histories of a plurality of users, wherein the watch histories reflect videos watched by respective users of the plurality of users, and identify based on the watch histories a set of videos that have been watched by individual users of the plurality of users;
  an identification component configured to analyze a watch history of a first user, wherein the watch history of the first user reflects videos watched by the first user, and identify based on the watch history of the first user, one or more videos watched by the first user that are included in the set of videos; and
  a recommendation component configured to recommend the one or more videos to the first user for re-watching; and
  an auto-play component configured to automatically replay at least one of the one or more videos, wherein the auto-play component is configured to initiate the automatic replay as a function of first user context or first user preference.

15. A method comprising:
analyzing, by a system including a processor, a watch history of a user, wherein the watch history of the user reflects videos watched by the user;
crawling, by the system, watch histories of a plurality of other users, wherein the watch histories reflect videos watched by respective other users of the plurality of other users;
identifying, by the system based on the watch histories of the plurality of other users, a set of videos that have been re-watched over a threshold number of times by individual other users of the plurality of other users;
identifying, by the system, one or more videos watched by the user that are included in the set of videos that have been re-watched over the threshold number of times by the individual other users of the plurality of other users; and
recommending the one or more videos to the user for re-watching.

16. The method of claim 15, further comprising:
identifying one or more videos the user expressed a liking for that are included in the set of videos; and
recommending the one or more videos the user expressed a liking for that are included in the set of videos to the user for re-watching.

17. The method of claim 15, further comprising:
inferring respective probabilities that the user will re-watch respective videos of the one or more videos based in part on frequency with which the respective videos of the one or more videos have been re-watched by the individual other users of the plurality of other users;
ranking the respective videos of the one or more videos as a function of probabilities; and
recommending the one or more videos based in part on the ranking.

18. The method of claim 15, further comprising:
inferring respective probabilities that the user will re-watch respective videos of the one or more videos based in part on frequency and recency with which the user watched the respective videos of the one or more videos;
ranking the respective videos of the one or more videos as a function of probabilities; and
recommending the one or more videos based in part on the ranking.

19. A non-transitory computer-readable medium comprising computer-readable instructions that, in response to execution, cause a system including a processor to perform operations, comprising:
analyzing a watch history of a user, wherein the watch history of the user reflects videos watched by the user;
crawling watch histories of a plurality of other users, wherein the watch histories reflect videos watched by respective other users of the plurality of other users;
identifying, based on the watch histories, a set of videos that have been re-watched over a threshold number of times by individual other users of the plurality of other users;
identifying, one or more videos watched by the user that are included in the set of videos that have been re-watched over the threshold number of times by the individual other users of the plurality of other users; and
recommending the one or more videos to the first user for re-watching.

20. The non-transitory computer-readable medium of claim 19, the operations further comprising:
inferring respective probabilities that the user will re-watch respective videos of the one or more videos based in part on frequency with which the respective videos of the one or more videos have been re-watched by the individual other users of the plurality of other users;
ranking the respective videos of the one or more videos as a function of probabilities; and
recommending the one or more videos based in part on the ranking.

* * * * *